(12) United States Patent
Parkin

(10) Patent No.: US 12,035,084 B2
(45) Date of Patent: Jul. 9, 2024

(54) OPTICAL COMMUNICATIONS NETWORK AND METHOD FOR CONTINUOUS SERVICE PROVISION THEREON

(71) Applicant: British Telecommunications Public Limited Company, London (GB)

(72) Inventor: Neil Parkin, London (GB)

(73) Assignee: British Telecommunications Public Limited Company (GB)

( * ) Notice: Subject to any disclaimer, the term of this patent is extended or adjusted under 35 U.S.C. 154(b) by 183 days.

(21) Appl. No.: 17/754,435

(22) PCT Filed: Jun. 23, 2020

(86) PCT No.: PCT/EP2020/067546
§ 371 (c)(1),
(2) Date: Apr. 1, 2022

(87) PCT Pub. No.: WO2021/069113
PCT Pub. Date: Apr. 15, 2021

(65) Prior Publication Data
US 2022/0385999 A1    Dec. 1, 2022

(30) Foreign Application Priority Data

Oct. 7, 2019  (EP) .................................. 19201740
Oct. 7, 2019  (GB) .................................. 1914457

(51) Int. Cl.
*H04Q 11/00* (2006.01)

(52) U.S. Cl.
CPC . *H04Q 11/0067* (2013.01); *H04Q 2011/0081* (2013.01); *H04Q 2213/1301* (2013.01)

(58) Field of Classification Search
CPC ....... H04Q 11/0067; H04Q 2011/0081; H04Q 2213/1301

(Continued)

(56) References Cited

U.S. PATENT DOCUMENTS 7,865,077 B2   1/2011   Mukojima
8,244,125 B2   8/2012   Biegert et al.
(Continued)

FOREIGN PATENT DOCUMENTS

CN   1921357 A     2/2007
CN   101667865 A   3/2010
(Continued)

OTHER PUBLICATIONS

Combined Search and Examination Report under Sections 17 and 18(3) for Great Britain Application No. 1914457.5, mailed on Mar. 25, 2020, 6 pages.

(Continued)

*Primary Examiner* — Abbas H Alagheband
(74) *Attorney, Agent, or Firm* — Pranger Law PC

(57) ABSTRACT

There is provided an optical network comprising first and second PONs, each including an OLT; one or more ONUs; and an optical splitter downstream of the OLT and upstream of the one or more ONUs. The splitter includes a plurality of inputs, one of the inputs being coupled to the OLT, and a plurality of outputs, each of the ONUs being coupled to one of the outputs. The optical network further includes an optical switch configured to switch the optical network from a first configuration to a second configuration in response to a fault being detected on the first PON. The second PON's splitter has a spare output that is uncoupled in the first configuration; and the first PON's splitter has a spare input that is: uncoupled in the first configuration, and coupled to the spare output of the second PON's splitter in the second configuration.

25 Claims, 10 Drawing Sheets

(58) Field of Classification Search
USPC .......................................................... 398/208
See application file for complete search history.

(56) References Cited

U.S. PATENT DOCUMENTS

| | | | |
|---|---|---|---|
| 9,319,758 B2 | 4/2016 | Goswami et al. | |
| 2002/0071149 A1* | 6/2002 | Xu | H04B 10/032 370/216 |
| 2008/0025724 A1* | 1/2008 | Ozaki | H04Q 11/0067 398/68 |
| 2008/0298803 A1* | 12/2008 | Warner | H04J 3/1694 398/43 |
| 2010/0098407 A1* | 4/2010 | Goswami | H04B 10/272 398/1 |
| 2010/0183298 A1* | 7/2010 | Biegert | H04Q 11/0067 398/17 |
| 2012/0251097 A1* | 10/2012 | Elmardini | H04B 10/079 398/5 |
| 2013/0089316 A1* | 4/2013 | Trojer | H04Q 11/0062 398/2 |
| 2016/0013864 A1* | 1/2016 | Rafel Porti | H04J 14/0295 398/58 |
| 2017/0111137 A1 | 4/2017 | Gao | |
| 2017/0288777 A1* | 10/2017 | Mahloo | H04Q 11/0067 |
| 2018/0062746 A1 | 3/2018 | Ohteru et al. | |
| 2018/0176666 A1 | 6/2018 | Du et al. | |
| 2018/0227072 A1 | 8/2018 | Luo et al. | |
| 2021/0006334 A1 | 1/2021 | Yoshino | |

FOREIGN PATENT DOCUMENTS

| | | | | |
|---|---|---|---|---|
| CN | 103178971 A | * | 6/2013 | ........... H04B 10/032 |
| CN | 106160918 A | | 11/2016 | |
| CN | 106160918 B | | 7/2018 | |
| EP | 2556680 A1 | | 2/2013 | |
| EP | 2621194 A1 | | 7/2013 | |
| EP | 3134986 A1 | | 3/2017 | |
| EP | 2556680 B1 | * | 6/2018 | ......... H04Q 11/0062 |
| EP | 3134986 B1 | * | 3/2021 | ............ H04B 10/27 |
| JP | 2016119535 A | | 6/2016 | |
| WO | WO-2013091471 A1 | * | 6/2013 | .......... H04B 10/032 |
| WO | 2017206690 A1 | | 12/2017 | |
| WO | 2021069113 A1 | | 4/2021 | |
| WO | 2021103344 A1 | | 6/2021 | |

OTHER PUBLICATIONS

Examination Report under Section 18(3) for Great Britain Application No. 1914457.5, mailed on Jul. 26, 2021, 3 pages.
Extended Search Report for European Application No. 19201740.8, mailed on Apr. 3, 2020, 9 pages.
International Search Report and Written Opinion for Application No. PCT/EP2020/067546, mailed on Sep. 21, 2020, 12 pages.
International Telecommunication Union, "Series G: Transmission Systems and Media, Digital Systems and Networks, Passive Optical Network Protection Considerations," Supplement 51, Jun. 2017, 46 pages.
Mitsui T., et al., "Flexible and Scalable PON Protection Architecture using N:M Redundancy toward Next Generation Access Network," 17th Asia-Pacific Conference on Communications (APCC), Oct. 2-5, 2011, 6 pages.
Combined Search and Examination Report received for Great Britain Patent Application No. 2204184.2, mailed on Apr. 12, 2022, 9 pages.
International Preliminary Report on Patentability received for PCT Patent Application No. PCT/EP2020/067546, mailed on Apr. 21, 2022, 9 pages.
Chowdhury, et al., "Building a Green Wireless-Optical Broadband Access Network (WOBAN)", Journal of Lightwave Technology, vol. 28, No. 16, Aug. 15, 2010, pp. 2219-2229.
Zhang, et al., "Designing Energy-Efficient Optical Line Terminal for TDM Passive Optical Networks", IEEE Sarnoff Symposium, 2011, 5 pages.

* cited by examiner

OPTICAL COMMUNICATIONS NETWORK AND METHOD FOR CONTINUOUS SERVICE PROVISION THEREON

PRIORITY CLAIMS

The present application is a National Phase entry of PCT Application No. PCT/EP2020/067546, filed Jun. 23, 2020, which claims priority from EP Patent Application No. 19201740.8, filed Oct. 7, 2019 and GB Patent Application No. 1914457.5, filed Oct. 7, 2019, each of which is hereby fully incorporated herein by reference.

TECHNICAL FIELD

The present disclosure relates to systems and methods for providing continuous communication service on passive optical networks (PONs). More specifically, an aspect relates to an optical network, a method of operating such an optical network, a computer program comprising instructions which, when the program is executed by a computer, cause the computer to carry out such a method, a computer-readable data carrier having stored thereon such a computer program and a data carrier signal carrying such a computer program.

BACKGROUND

PONs, otherwise known as the "last mile" between internet service providers (ISPs) and subscribers, communicate data between exchanges (otherwise known as the service provider's central office (CO) or point of presence (PoP)) and end users over optical fibers. The term "downstream" will be used herein to refer to the direction from the exchange to a subscriber device, and "upstream" from the subscriber device to the exchange. Each PON comprises an optical line terminal (OLT) at the exchange and one or more optical network units (ONUs) or optical network terminals (ONTs) at customer premises. The International Telecommunication Union (ITU) defines an ONT as a special case of an ONU; an ONT being an optical terminal that serves a single subscriber, while an ONU is an optical terminal that serves one or more subscribers, for example in a residential or office block. The generic term ONU will be used in this document. Generally, a single optical fiber couples the OLT to a passive optical splitter, which has multiple output fibers. Each ONU is coupled to the splitter by one of those output fibers. (The term "coupled" as used herein refers to optical coupling.)

Data can be transmitted bidirectionally over the PON by using one wavelength of light for downstream transmissions from the OLT, via the splitter, to the ONUs and another wavelength of light for upstream transmissions from the ONUs, via the splitter, to the OLT. When discussing inputs and outputs to splitters in this document, these terms are to be understood as referring to light traversing the splitter in the downstream direction. Accordingly, upstream light traversing a splitter enters the splitter through one of its "outputs" and exits the splitter through one of its "inputs".

FIG. 1 illustrates the abovementioned features in an example optical network 1000. An exchange 1100 houses several OLTs 1110, 1120, 1130. Each of those OLTs is the upstream-most point of one or more PONs, but only one PON is shown, extending via a feeder fiber 1210 from the OLT 1110 to a 2×32 splitter 1310. (Other types of splitter are sometimes used, for example 2×4, 2×8 etc.) The splitter 1310 has 32 outputs including output fibers 1410 and 1411 which are in use. Output fiber 1410 is routed to an office block 1510 which has an ONU 1511 coupled to the output fibers 1410. The office block 1510 houses three subscriber business premises 1512, 1513 and 1514, each of which is served by the ONU 1511 via either an optical or electrical connection (not shown). The output fiber 1411 is routed to a house 1520 where it is coupled to an ONU 1521.

The optical fibers used in PONs are vulnerable to various faults. Fibers laid in underground ducts may become inoperable due to accidental damage during roadworks, or due to other works in inter-duct connecting chambers. Fibers carried overhead can be broken by tree falls. Fibers can also be vulnerable to damage caused by wildlife. OLTs can also sometimes develop faults. For example, an OLT may lose power due to an electricity outage, or become overheated due to dust build up in cooling fans. Feeder fiber connections to OLTs can also sometimes break or be erroneously disconnected due to human error. Various topologies for optical networks have been developed to protect PONs to minimise the impact on customers of such faults occurring. ITU-T Series G Supplement 51 (June 2017) "Passive optical network protection considerations" describes how such topologies can be used to provide redundancy.

In the Type B PON protection topology primary and backup feeder fibers are run via different routes from two ports on the OLT to the splitter, with the OLT being capable of automatic switching from the primary to the backup fiber if necessary. However, no protection from OLT failure or disconnection is provided.

Dual-parented type B PON protection provides two OLTs in separate geographical locations, with one inputting a primary feeder fiber into the splitter and the other inputting a backup feeder fiber. Thus, protection from OLT failure is provided in this case.

These conventional topologies can provide protection against feeder fiber failure, and dual-parented type B can also protect against OLT failure and disconnection. However, both of these topologies rely on the principle of redundancy; providing backup apparatus, which can be switched in should the primary apparatus fail—but may never be used. The cost of the backup apparatus, as well as its installation and maintenance, is significant. It is therefore rarely used to protect the service of low value (e.g. residential or small business) subscribers.

What is needed is a more resource-efficient way of protecting subscriber service from feeder fiber and OLT faults.

SUMMARY

According to a first aspect, there is provided an optical network comprising first and second PONs, each of the first and second PONs comprising: an OLT; one or more ONUs; and an optical splitter downstream of said OLT and upstream of said one or more ONUs, the splitter comprising: a plurality of inputs, one of said inputs being coupled to said OLT, and a plurality of outputs, each of said ONUs being coupled to one of said outputs; characterized in that the optical network further comprises an optical switch configured to switch the optical network from a first configuration to a second configuration in response to a fault being detected on the first PON; wherein: the second PON's splitter has a spare output that is uncoupled in the first configuration; and the first PON's splitter has a spare input that is: uncoupled in the first configuration, and coupled to the spare output of the second PON's splitter in the second configuration.

The second PON is thus capable of providing protection to the first PON.

In the first configuration, the first and second PONs operate independently. The spare output of the second PON's splitter can be considered to be "spare" in the sense that it is not required for independent operation of the second PON. Similarly, the spare input of the first PON's splitter can be considered to be "spare" in the sense that it is not required for independent operation of the first PON.

The optical switch is a switch which operates entirely in the optical domain, i.e. not requiring any conversion of communication signals traversing the switch between the optical and electrical domains.

The optical switch can be configured to be powered by energy harvested from light transmitted through the optical network.

The harvested energy can be stored by a capacitor, optionally a supercapacitor.

The energy can be harvested from a further splitter coupled between the spare input of the first PON's splitter and the optical switch.

The energy can be harvested from one of the outputs of the first PON's splitter.

The energy can be harvested directly from said output of the first PON's splitter.

The energy can be harvested from a further splitter coupled to the first PON downstream of its splitter.

The energy can be harvested from a spare input of the second PON's splitter. The spare input of the second PON's splitter can be considered to be "spare" in the sense that it is otherwise uncoupled; it is not required for independent operation of the second PON.

The optical network can further comprise a light detector arranged to detect light transmitted over the first PON, the light detector being operably coupled to the optical switch such that the optical switch switches the optical network from the first configuration to the second configuration in response to a signal from the light detector.

The light detector can be configured to detect light transmitted through one of the outputs of the first PON's splitter.

The output of the first PON's splitter can be directly coupled only to the light detector.

The light detector can be configured to detect light transmitted through a further splitter coupled to the first PON downstream of its splitter.

The light detector can be configured to detect light transmitted through the spare input of the first PON's splitter, said spare input being coupled to both the optical switch and the light detector via a further splitter.

The light detector can be operably coupled to the optical switch such that the optical switch switches the optical network from the first configuration to the second configuration in response to: no light being detected by the light detector for a predetermined period of time; and/or light detected by the light detector being of an intensity below a predetermined threshold; and/or no light of an intensity above a predetermined threshold being detected by the light detector for a predetermined period of time.

The optical switch can be configured to be powered by energy harvested from the light detector.

The light detector can be a photodiode.

The optical switch can be a microelectromechanical switch (MEMS).

The first PON's splitter can be a 2×N splitter, optionally a 2×32 splitter.

The optical network can further comprise one or more additional PONs configured with respect to the first and second PONs such that each of the first, second and one or more additional PONs is capable of providing protection to another of the first, second and one or more additional PONs in a cyclical manner.

The optical network can further comprise a further optical switch configured to switch the optical network from the first configuration to a third configuration in response to a fault being detected on the second PON; wherein: the first PON's splitter has a spare output that is uncoupled in the first configuration; and the second PON's splitter has a spare input that is: uncoupled in the first configuration, and coupled to the spare output of the first PON's splitter in the third configuration.

The first and second PONs thus form a pair of PONs capable of providing one another with mutual protection.

The spare output of the first PON's splitter can be considered to be "spare" in the sense that it is not required for independent operation of the first PON. Similarly, said spare input of the second PON's splitter can be considered to be "spare" in the sense that it is not required for independent operation of the second PON.

The optical network can further comprise one or more additional pairs of PONs capable of providing one another with mutual protection in the same manner as the first and second PONs.

The optical network can further comprise two or more additional PONs configured with respect to the first and second PONs such that each of the first, second and two or more additional PONs is capable of providing protection to one or more others of the first, second and two or more additional PONs in a cyclical or mutual manner.

According to a second aspect, there is provided a method of operating the optical network of the first aspect, the method comprising: registering all ONUs of the first PON with the OLT of the first PON and registering all ONUs of both the first and second PONs with the OLT of the second PON; subsequently, with the optical network in the first configuration, obtaining an indication that a fault has been detected on the first PON; and responsive thereto, initiating switching of the optical network to the second configuration.

Obtaining an indication that a fault has been detected on the first PON can comprise detecting the fault, for example with a light detector. Alternatively, obtaining an indication that a fault has been detected on the first PON can comprise receiving a signal indicating that a fault has been detected over a communication link, which could for example be wired or wireless.

Initiating switching of the optical network to the second configuration can comprise switching the optical network to the second configuration, for example by direct control of the optical switch. Alternatively, initiating switching of the optical network to the second configuration can comprise transmitting a signal instructing switching of the optical network to the second configuration over a communication link, which could for example be wired or wireless.

The method can further comprise, while the optical network is in the second configuration, communicating between the OLT of the second PON and one or more of the ONUs of the first PON.

The method can further comprise, prior to detecting the fault, reserving bandwidth on the second PON for the ONUs of the first PON; wherein the communicating between the OLT of the second PON and one or more of the ONUs of the first PON is performed using said reserved bandwidth.

The method can further comprise: subsequent to switching the optical network to the second configuration, initiating fixing of the fault; and responsive thereto, initiating switching of the optical network to the first configuration.

Initiating fixing of the fault can comprise fixing the fault. Alternatively, initiating fixing of the fault can comprise transmitting a signal instructing fixing of the fault over a communication link, which could for example be wired or wireless.

Obtaining an indication that a fault has been detected on the first PON can comprise determining that: no light has been detected by the light detector for a predetermined period of time; and/or light detected by the light detector is of an intensity below a predetermined threshold; and/or no light of an intensity above a predetermined threshold has been detected for a predetermined period of time.

The method can be implemented by a computer system.

According to a third aspect, there is provided a computer program comprising instructions which, when the program is executed by a computer, cause the computer to carry out the method of the second aspect.

According to a fourth aspect, there is provided a computer-readable data carrier having stored thereon the computer program of the third aspect.

According to a fifth aspect, there is provided a data carrier signal carrying the computer program of the third aspect.

BRIEF DESCRIPTION OF THE FIGURES

Aspects of the present disclosure will now be described by way of example with reference to the accompanying figures. In the figures.

DETAILED DESCRIPTION

The following description is presented to enable any person skilled in the art to make and use the system and is provided in the context of a particular application. Various modifications to the disclosed embodiments will be readily apparent to those skilled in the art.

Figure 1:
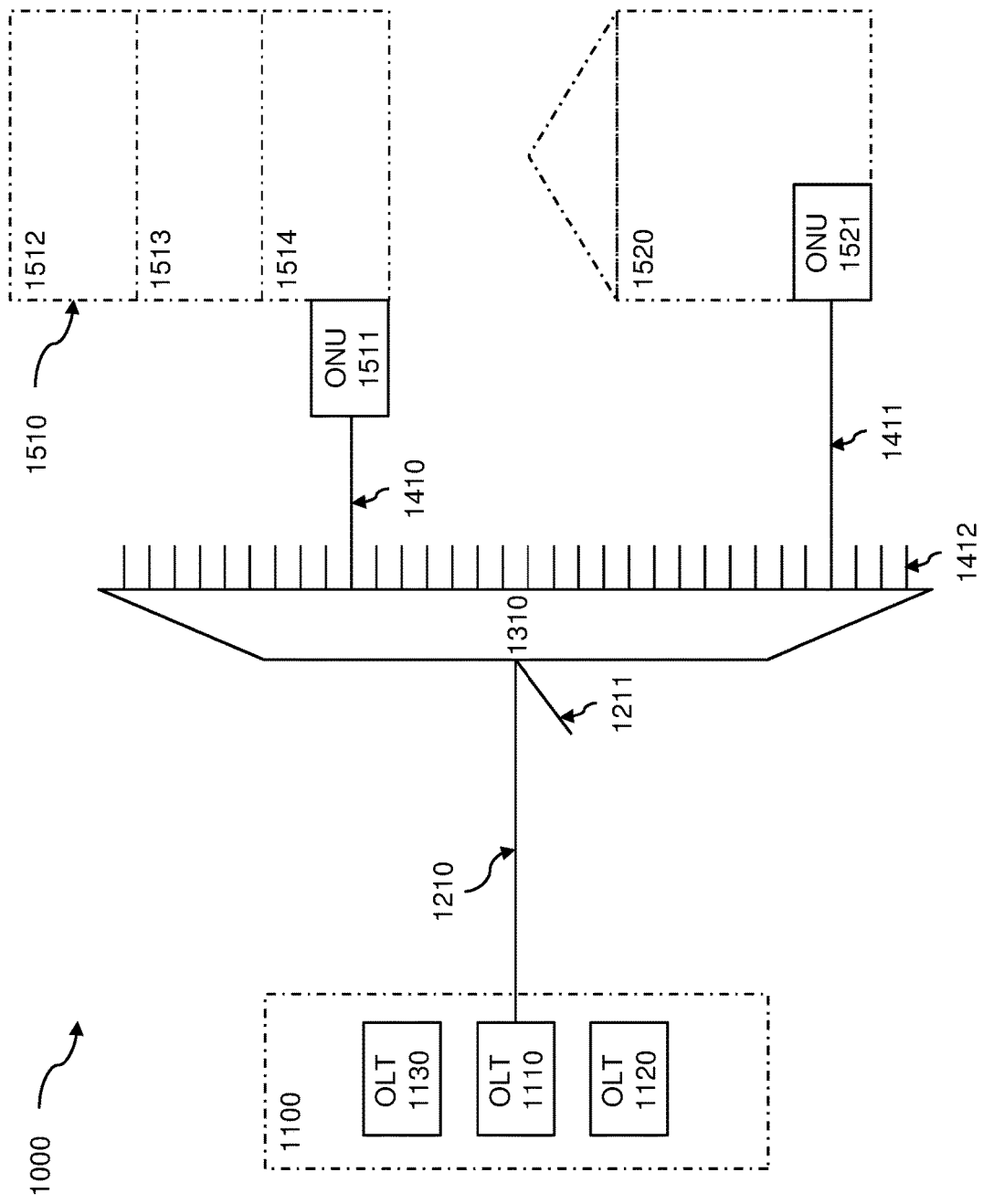
FIG. 1 illustrates an example optical network.

The type of optical splitter most commonly found in PONs is a 2×N splitter with two inputs and N outputs, for example the 2×32 splitter shown in FIG. 1. Generally, only one of the inputs is used (1210 in FIG. 1), with the other (1211 in FIG. 1) spare, i.e. not operatively coupled to any light source. Several of the outputs are also usually spare (e.g. 1412 in FIG. 1). More generally, M×N splitters are available, where M and N are both positive integers greater than 1. The present disclosure proposes making use of spare inputs and outputs of such splitters to provide PON protection.

According to the present disclosure, splitters of first and second PONs are reversibly cascaded by connecting a spare input of the first PON's splitter to a spare output of the second PON's splitter via an optical switch. In normal operation the switch is left open so that the two PONs operate independently. However, if the OLT and/or feeder fiber of the first PON fails the switch can be closed so that traffic to and from the first PON's ONUs can be routed via the second PON's splitter, feeder fiber and OLT. In this way the second PON provides protection for the first without requiring any additional apparatus beyond a single optical switch.

The term "optical switch" as used herein refers to a switch which operates entirely in the optical domain, i.e. not requiring any conversion of communication signals traversing the switch between the optical and electrical domains. The system can therefore function passively, with no electrical-optical conversion of communication signals at any point between the OLTs and ONUs.

The spare output of the second PON's splitter can be considered to be "spare" in the sense that it is not required for independent operation of the second PON. Similarly, the spare input of the first PON's splitter can be considered to be "spare" in the sense that it is not required for independent operation of the first PON.

Figure 2:
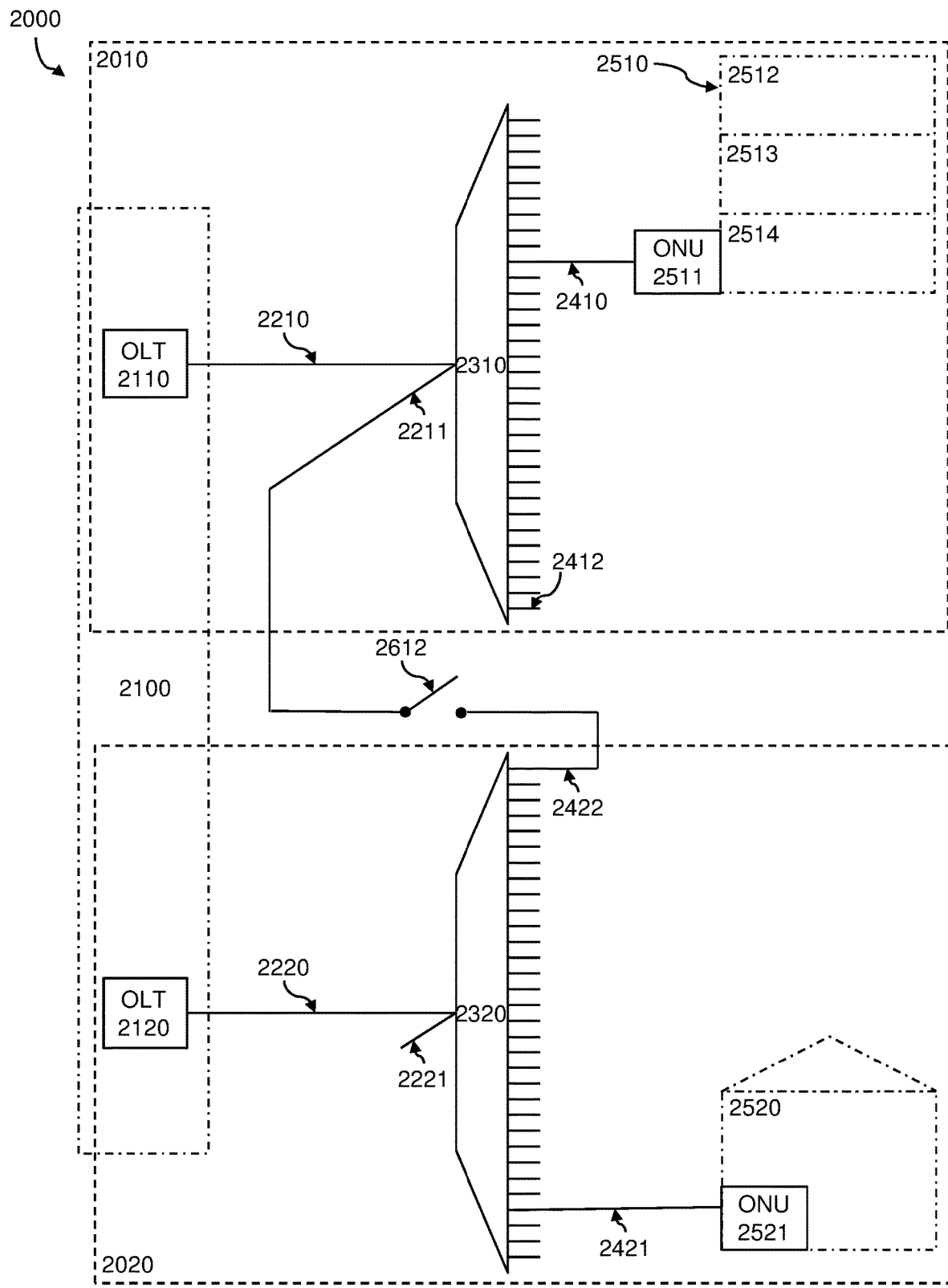
FIG. 2 illustrates an example PON protection topology.

FIG. 2 illustrates the PON protection topology described above. An optical network 2000 comprises a first PON 2010 and a second PON 2020.

The first PON 2010 comprises an OLT 2110, an ONU 2511 and an optical splitter 2310 downstream of the OLT 2110 and upstream of the ONU 2511. The splitter 2310 comprises a plurality of inputs, one of said inputs 2210 being coupled to the OLT 2110, and a plurality of outputs. The splitter 2310 has one or more spare inputs 2211 which are not coupled to the OLT 2110 of the first PON 2010. The ONU 2511 is coupled to one of the splitter outputs 2410. Other ONUs (not shown) may be coupled to other outputs of the splitter 2310. The ONU 2511 can for example provide connectivity to a building 2510 which houses multiple subscriber premises 2512, 2513, 2514. The splitter 2310 can have one or more spare outputs 2412 which are not coupled to any ONUs of the first PON 2010.

The second PON 2020 comprises an OLT 2120, an ONU 2521 and an optical splitter 2320 downstream of the OLT 2120 and upstream of the ONU 2521. The splitter 2320 comprises a plurality of inputs, one of said inputs 2220 being coupled to the OLT 2120, and a plurality of outputs. The splitter 2320 can have one or more spare inputs 2221 which are not coupled to the OLT 2120 of the second PON 2020. The ONU 2521 is coupled to one of the splitter outputs 2421. Other ONUs (not shown) may be coupled to other outputs of the splitter 2320. The ONU 2521 can for example provide connectivity to a house 2520. The splitter 2320 has one or more spare outputs 2422 which are not coupled to any ONUs of the second PON 2020.

The optical network 2000 further comprises an optical switch 2612 configured to switch the optical network 2000 from a first configuration to a second configuration in response to a fault being detected on the first PON 2010. The topology which achieves this is as follows. The second PON's splitter 2320 has a spare output 2422 that is uncoupled in the first configuration. The first PON 2010's splitter 2310 has a spare input 2211 that is uncoupled in the first configuration and coupled to the spare output 2422 of the second PON 2020's splitter 2320 in the second configuration by closing the switch 2612.

Figure 3:
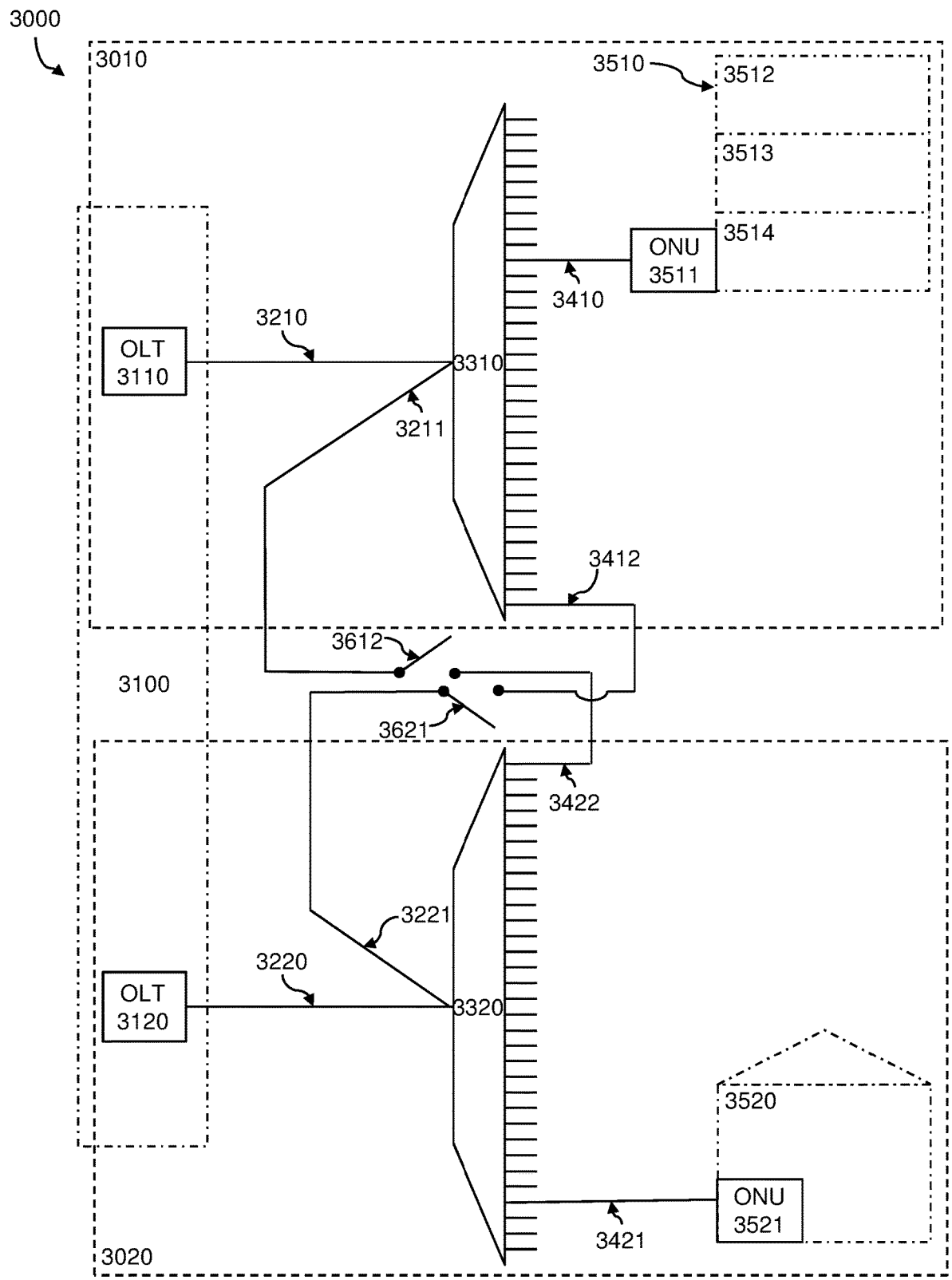
FIG. 3 illustrates an example mutual PON protection topology.

FIG. 3 illustrates how the PON protection topology of FIG. 2 can be extended to provide mutual protection between a first PON 3010 and a second PON 3020 of an optical network 3000.

The first PON 3010 comprises an OLT 3110, an ONU 3511 and an optical splitter 3310 downstream of the OLT 3110 and upstream of the ONU 3511. The splitter 3310 comprises a plurality of inputs, one of said inputs 3210 being coupled to the OLT 3110, and a plurality of outputs. The splitter 3310 has one or more spare inputs 3211 which are not coupled to the OLT 3110 of the first PON 3010. The ONU 3511 is coupled to one of the splitter outputs 3410. Other ONUs (not shown) may be coupled to other outputs of the splitter 3310. The ONU 3511 can for example provide connectivity to a building 3510 which houses multiple subscribers 3512, 3513, 3514. The splitter 3310 has one or more spare outputs 3412 which are not coupled to any ONUs of the first PON 3010.

The second PON 3020 comprises an OLT 3120, an ONU 3521 and an optical splitter 3320 downstream of the OLT 3120 and upstream of the ONU 3521. The splitter 3320 comprises a plurality of inputs, one of said inputs 3220 being coupled to the OLT 3120, and a plurality of outputs. The splitter 3320 has one or more spare inputs 3221 which are not coupled to the OLT 3120 of the second PON 3020. The ONU 3521 is coupled to one of the splitter outputs 3421. Other ONUs (not shown) may be coupled to other outputs of the splitter 3320. The ONU 3521 can for example provide connectivity to a house 3520. The splitter 3320 has one or more spare outputs 3422 which are not coupled to any ONUs of the second PON 3020.

The optical network 3000 further comprises an optical switch 3612 configured to switch the optical network 3000 from a first configuration to a second configuration in response to a fault being detected on the first PON 3010. The topology which achieves this is as follows. The splitter 3320 of the second PON 3020 has a spare output 3422 that is uncoupled in the first configuration. The splitter 3310 of the first PON 3010 has a spare input 3211 that is uncoupled in the first configuration and coupled to the spare output 3422 of the second PON 3020's splitter 3320 in the second configuration by closing the switch 3612.

The optical network 3000 further comprises a further optical switch 3621 configured to switch the optical network 3000 from the first configuration to a third configuration in response to a fault being detected on the second PON 3020. The topology which achieves this is as follows. The splitter 3310 of the first PON 3010 has a spare output 3412 that is uncoupled in the first configuration. The splitter 3320 of the second PON 3020 has a spare input 3221 that is uncoupled in the first configuration and coupled to the spare output 3412 of the first PON 3010's splitter 3310 in the third configuration.

It can be seen that the protection topologies described above can be extended to cover more than two PONs. This could be achieved by pairing PONs for mutual protection, effectively repeating the topology of FIG. 3. Alternatively, PONs could protect one another in a cyclical way, for example an optical network comprising first, second and third PONs could have a protection topology wherein the first PON is protected by the second, the second PON by the third and the third PON by the first. A combination of these arrangements could also be used.

Although FIGS. 2 and 3 show the OLTs 2110, 2120 and 3110, 3120 of the first and second PONs 2010, 2020 and 3010, 3020 respectively being co-located in a single exchange 2100, 3100, they could alternatively be in geographically separate exchanges.

The optical switches 2612, 3612, 3621 could for example be microelectromechanical switches (MEMS). They could be powered by batteries, a mains electricity supply, or could harvest energy from light transmitted through the optical network, for example using a photodiode. That energy could then be stored for future use, for example in a capacitor, e.g. a supercapacitor. An energy harvesting device could be located anywhere in the optical network with access to the light transmitted through it. In most optical networks more light energy is generally available in the downstream direction however, since the downstream laser is firing almost continuously, while the ONU lasers generally take turns to transmit upstream signals so there are gaps in the upstream light on the connected splitter outputs and even upstream of the splitter during guard intervals between timeslots allocated to different ONUs.

A light detector, such as a photodiode, can be used to detect light transmitted over the protected PON in order to determine when a fault occurs. For example, a fault could be detected by determining that no light has been detected for a predetermined period of time, that any light detected is of an intensity below a predetermined threshold or that no light of an intensity above a predetermined threshold has been detected for a predetermined period of time. Such a light detector can be operably connected to the switch so that the switch is automatically closed when the light detector detects a fault. A microcontroller operably connected to the light detector and the switch could for example be used to effect this control, or the control function could be integrated in a single component with the light detector. The light detector could also perform energy harvesting as described above. For example, types of integrated circuits (ICs) and application specific ICs (ASICs) commonly used in solar cells incorporate energy harvesting and light detecting functions, both performed by one or more photodiodes, and output a signal to indicate when the photodiodes are not illuminated.

FIGS. 4A, 4B, 4C and 4D illustrate some options for arranging a light detecting component and an energy harvesting component in the optical network 2000 of FIG. 2.

Figure 4A:
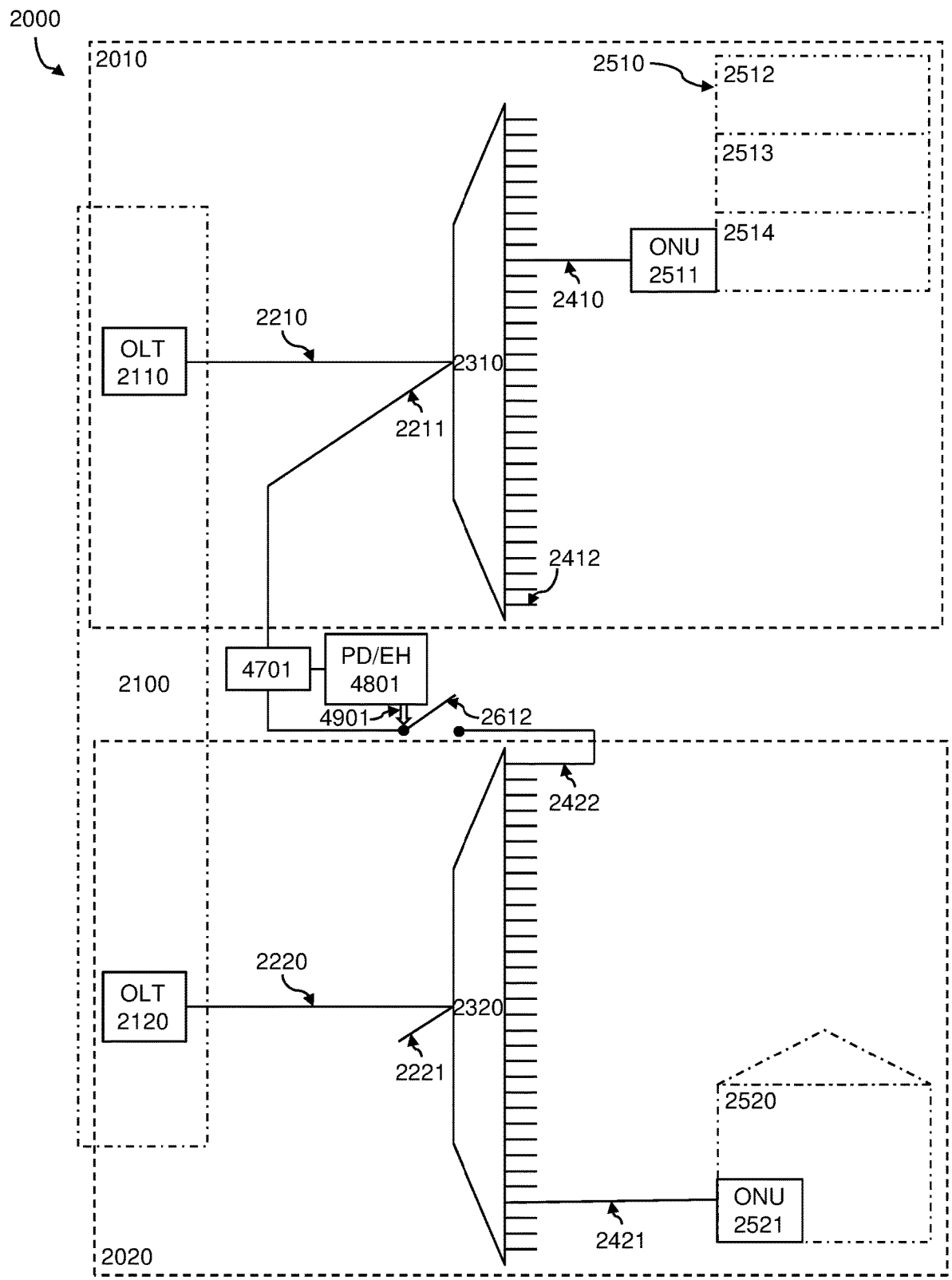
FIGS. 4A, 4B, 4C and 4D illustrate some exemplary options for arranging a light detecting component and an energy harvesting component in the optical network of FIG. 2.

In the configuration of FIG. 4A, a 50/50 optical splitter 4701 is arranged to receive upstream light from the spare input 2211 of the first PON 2010's splitter 2310. (Other splitter ratios could be used, for example 70/30 or 90/10.) One of the 50/50 splitter 4701's two outputs is coupled to the switch 2612 so that upstream light from the ONU 2511 of the first PON 2010 can flow through the switch 2612 when it is closed. The other of the 50/50 splitter 4701's two outputs is coupled to a multi-function component 4801 which combines photodetection, energy harvesting, energy storage and control functions. The multi-function component 4801 controls the switch 2612 to close when it detects a fault on the first PON 2010, with arrow 4901 representing both a control signal and provision of power. The multi-function component 4801 could for example detect a fault when it stops detecting upstream light from the spare input 2211 of the first PON 2010's splitter 2310. This configuration detects and harvests upstream light (from spare input 2211), which as explained above is less reliable than downstream light. ONU 2511 and any other ONUs on the first PON 2010 may need to increase the optical power output of their lasers to compensate for the upstream optical power tapped by the multi-function component 4801. However, this configuration does not require use of any customer fibers or other resources downstream of the first PON 2010's splitter 2310. It also combines functions to power and control the switch 2612 in a single multi-function component 4801.

Figure 4B:
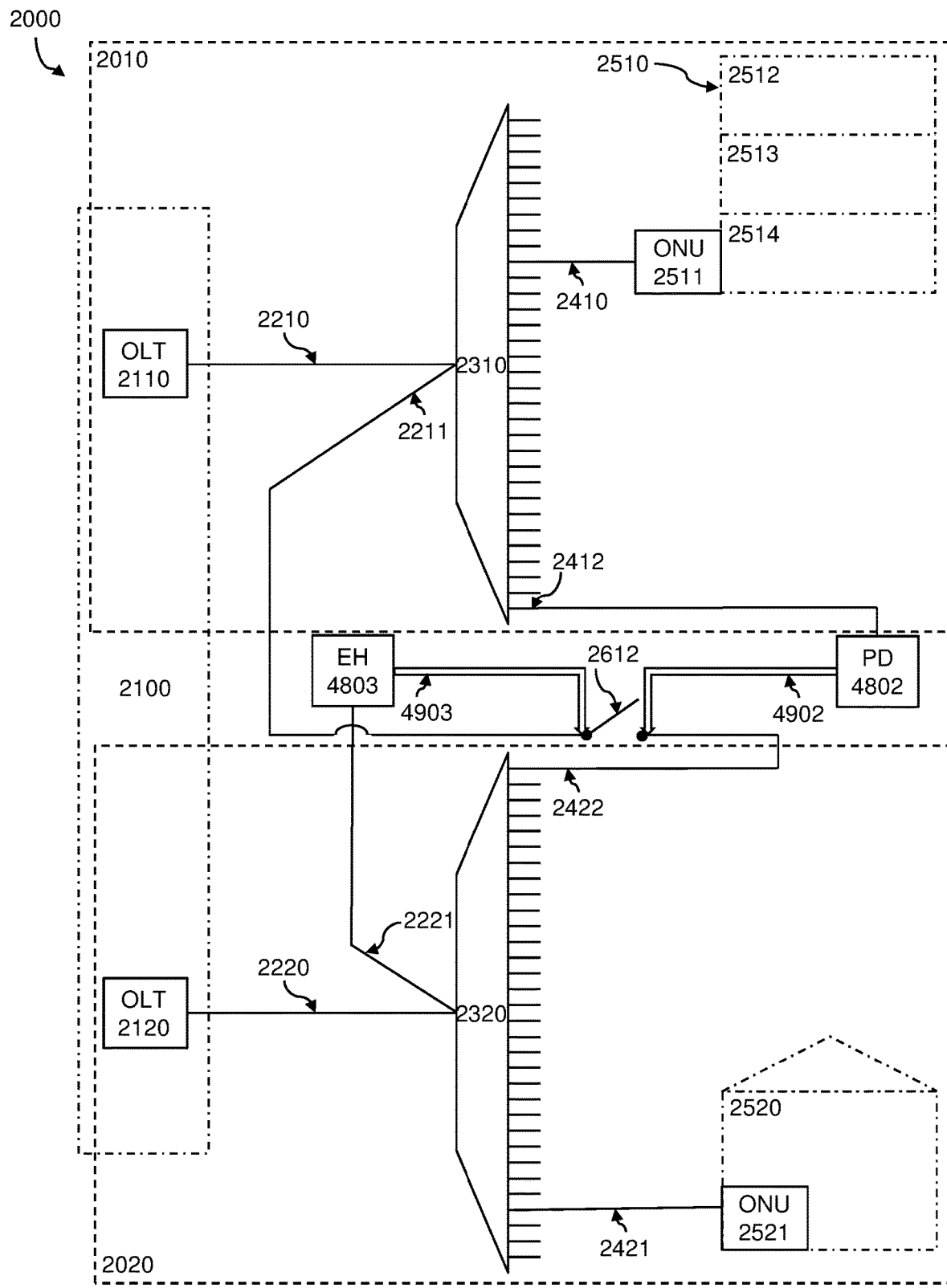

In the configuration of FIG. 4B, a photodetection component 4802 is coupled to a spare output 2412 of the first PON 2010's splitter 2310. The photodetection component 4802 outputs a control signal 4902 to the switch 2612 to cause it to close when the photodetection component 4802 detects a fault on the first PON 2010. The photodetection component 4802 could for example detect a fault when it stops detecting downstream light from the spare output 2412 of the first PON 2010's splitter 2310. An energy harvesting and storage component 4803 is coupled to the spare input 2221 of the second PON 2020's splitter 2320 and provides power to the switch 2612 as shown by arrow 4903. This configuration controls the switch 2612 by detecting downstream light (or rather, the lack thereof on spare output 2412), but harvests upstream light (from spare input 2221) and consumes one of the outputs 2412 of the first PON 2010's splitter 2310, reducing the number of ONUs which can be added to the first PON 2010. The ONU 2521 and any other ONUs on the second PON may need to boost the optical power of their lasers a little to compensate for the upstream optical power tapped by the energy harvesting component 4803. This configuration may therefore be more suitable for use where mutual protection is provided between the first and second PONs 2010, 2020, in a similar manner to that shown in FIG. 3, so that unprotected subscribers are not disadvantaged by the introduction of protection for other subscribers.

Figure 4C:
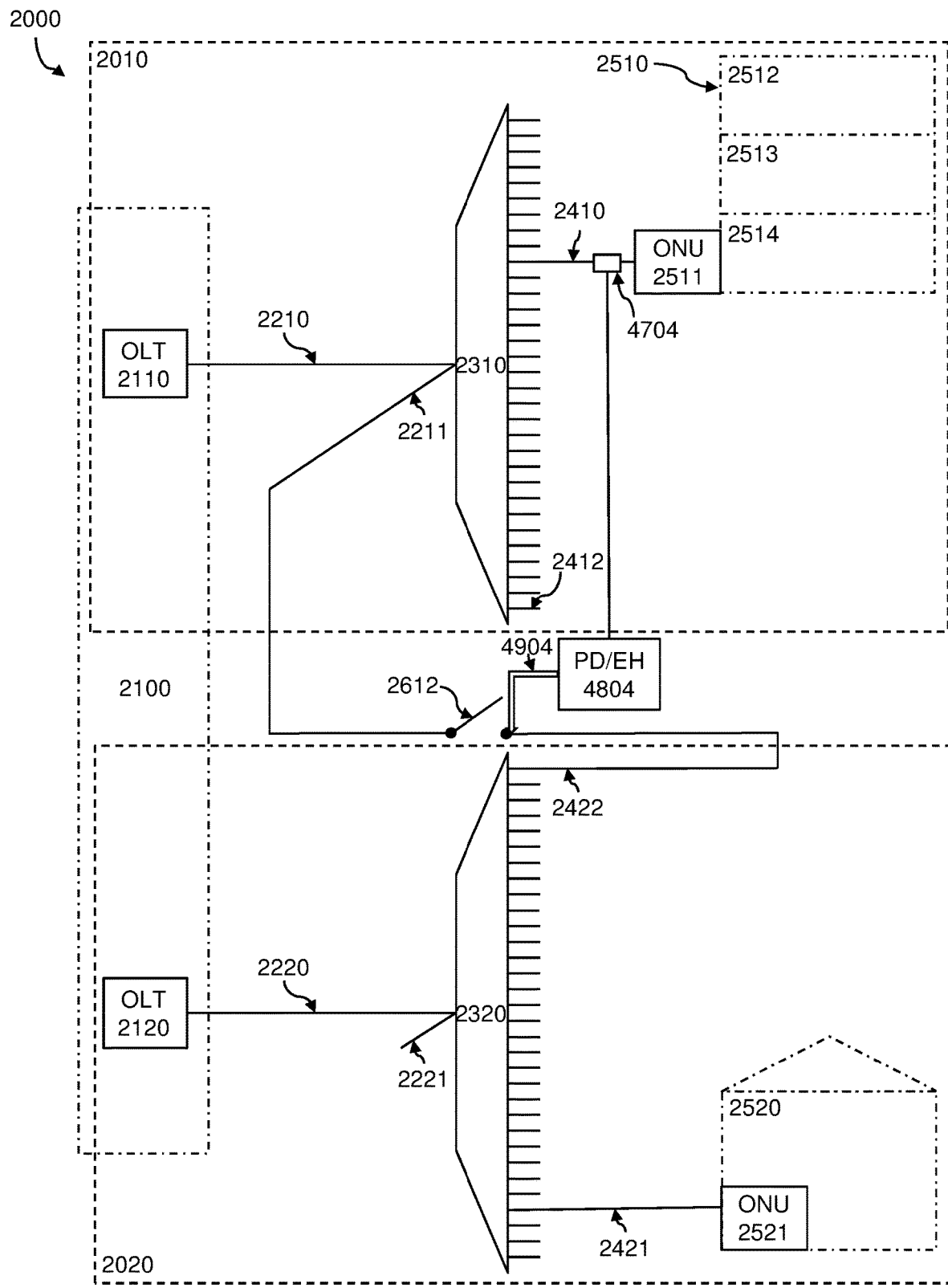

In the configuration of FIG. 4C, a 50/50 optical splitter 4704 is arranged to tap some of the downstream light from the link between the ONU 2511 and the splitter 2310 of the first PON 2010 to a multi-function component 4804 which combines photodetection, energy harvesting, energy storage and control functions. The multi-function component 4804 controls the switch 2612 to close when it detects a fault on the first PON 2010, with arrow 4904 representing both a control signal and provision of power. The multi-function component 4804 could for example detect a fault when it stops detecting downstream light from the output 2410 of the first PON 2010's splitter 2310. This configuration detects and harvests downstream light (from output 2410). It also combines functions to power and control the switch 2612 in a single component 4804 and does not reduce the number of ONUs which can be added to the first PON 2010.

Using the ONU 2511's connection 2410 to the first PON 2010 to tap the light needed to control and power the switch 2612 may be appropriate if one or more of the subscribers served by the ONU 2511 are subscribed to a service incorporating protection by the means described herein, but other subscribers on the first PON 2010 (not shown) only subscribe to a basic service without protection. This is because the ONU 2511 to which the 50/50 splitter 4704 is coupled is the only ONU which suffers any loss of optical power as a result of the presence of the protection components (i.e. the 50/50 splitter 4704, the multi-function component 4804 and the switch 2612). (Although in theory all ONUs on the first PON 2010 can be protected by the configuration shown in FIG. 4C, the protection service can be limited to only those subscribers who have subscribed to it by means of a registration process as will be described below in relation to FIG. 6.)

Figure 4D:
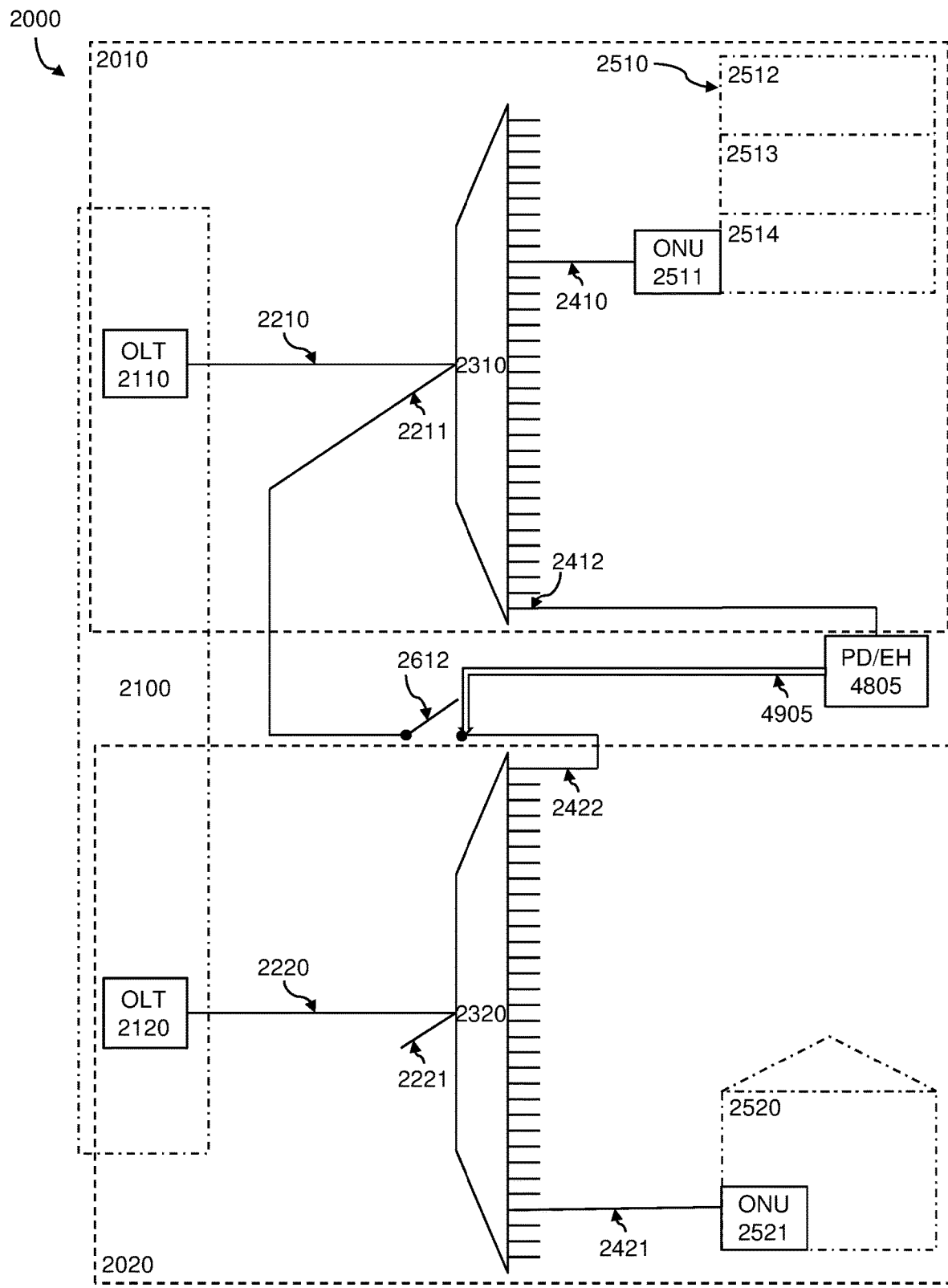

In the configuration of FIG. 4D, a multi-function component 4805 which combines photodetection, energy harvesting, energy storage and control functions is coupled to a spare output 2412 of the first PON 2010's splitter 2310. The multi-function component 4805 outputs a power and control signal 4905 to the switch 2612 to cause it to close when the multi-function component 4805 detects a fault on the first PON 2010. The multi-function component 4805 could for example detect a fault when it stops detecting downstream light from the spare output 2412 of the first PON 2010's splitter 2310. This configuration reduces the number of ONUs which can be added to the first PON 2010. However, it detects and harvests downstream light (from the spare output 2412) and combines functions to power and control the switch 2612 in a single multi-function component 4805. It also does not impact the optical power received by any of the ONUs or OLTs.

In the configurations of FIGS. 4C and 4D, where downstream light energy is harvested, the OLT 2110 of the first PON 2010 may need to increase the optical power output of its laser to compensate for the energy harvested when the optical network 2000 is in the first configuration. If light energy continues to be harvested in the second configuration then the OLT 2120 of the second PON 2020 may similarly need to increase the optical power output of its laser to compensate.

Regardless of the configuration used, the OLT 2120 of the second PON 2020 may need to increase the optical power output of its laser, at least when the optical network 2000 is in the second configuration. This is because, when the switch 2612 is closed, downstream light directed to the ONU 2511 and any other ONUs on the first PON 2010 must traverse a longer route than when the optical network is in the first configuration. That longer route not only includes a greater fiber distance, but also at least one additional splitter (2310), both of which contribute to greater optical power loss.

Figure 5:
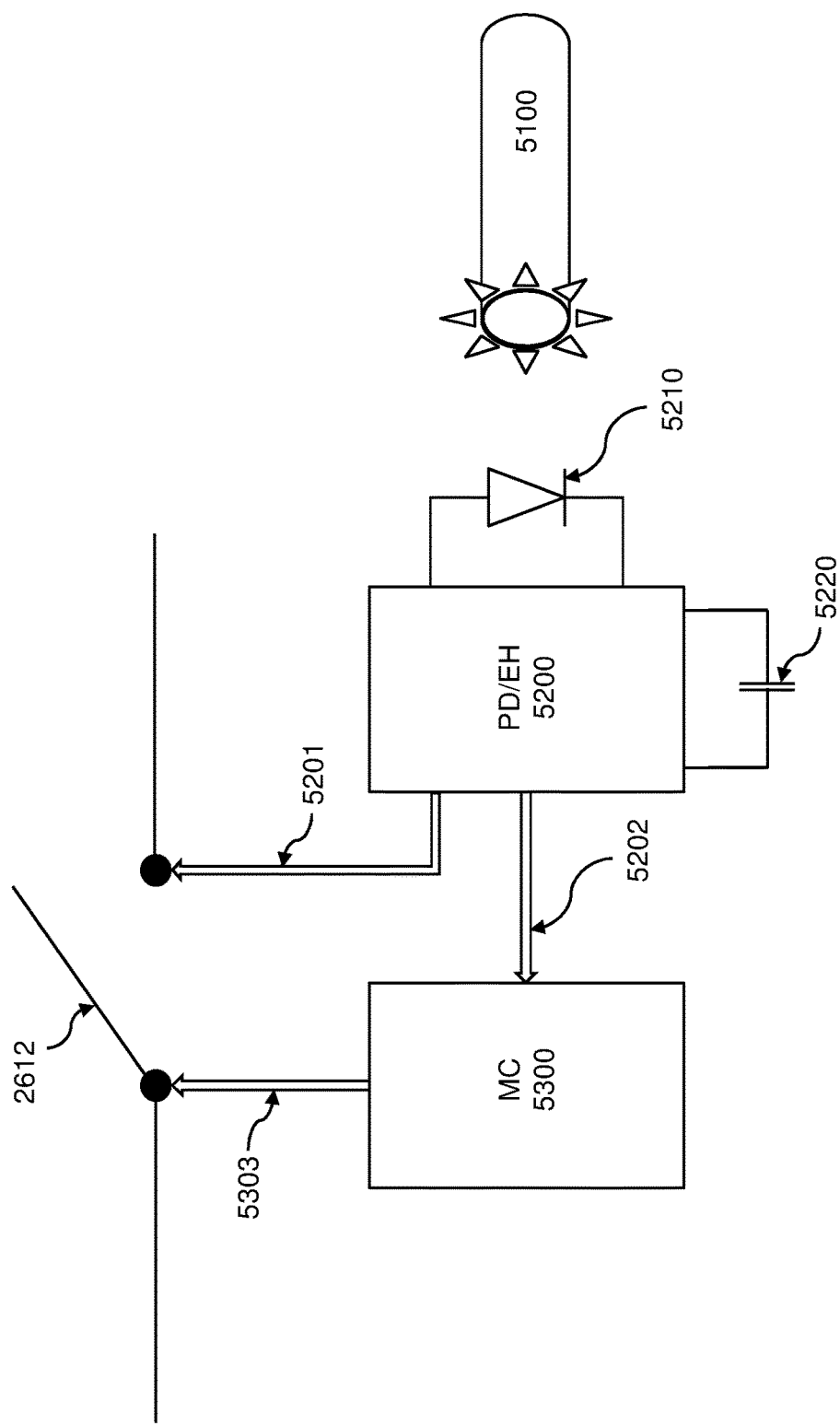
FIG. 5 illustrates an example combination photodetection and energy harvesting component.

FIG. 5 illustrates an example combination photodetection and energy harvesting component such as may be used in the optical network configurations of FIGS. 4A, 4C and 4D. When the first PON 2010 is functioning, an optical fiber 5100 of the first PON 2010 illuminates a photodiode 5210 of a combination photodetection/energy harvesting IC 5200. The electrical energy collected by the IC 5200 as a result is stored in its super capacitor 5220. When the optical fiber 5100 stops illuminating the photodiode 5210 a power signal 5201 is output from the IC 5200 to power the switch 2612. (The IC 5200 can comprise voltage conversion functionality to achieve this if necessary.) At the same time a power and control signal 5202 is output from the IC 5200 to a microcontroller 5300, which determines that a fault has occurred on the first PON and accordingly closes the switch 2612 by means of a control signal 5303. Alternatively, the power signal 5201 from the IC 5200 directly to the switch 2612 could be omitted and the control signal 5303 from the microcontroller 5300 could also provide the switch 2612 with power.

Figure 6:
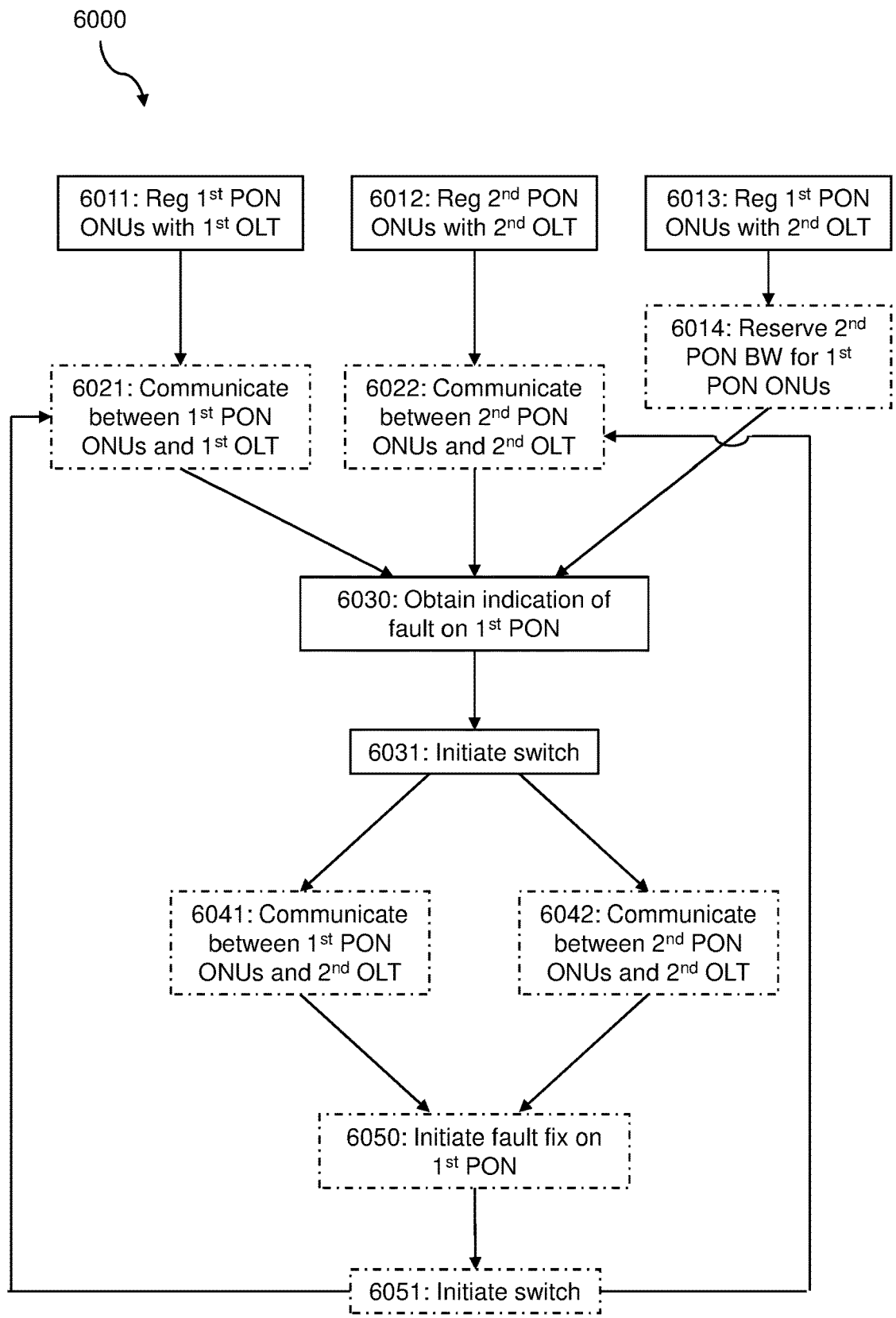
FIG. 6 is a flowchart illustrating an example method of operating an optical network.

FIG. 6 is a flowchart illustrating a method 6000 of operating an optical network such as the optical network 2000 of FIG. 2. The method 6000 begins with the optical network in the first configuration.

At 6011 all ONUs of the first PON are registered with the OLT of the first PON per normal PON operation. This means that communication between the ONUs of the first PON and the OLT of the first PON can proceed as normal at optional step 6021. Similarly, at 6012 all ONUs of the second PON are registered with the OLT of the second PON per normal PON operation. This means that communication between the ONUs of the second PON and the OLT of the second PON can proceed as normal at optional step 6022. In addition, at 6013 all ONUs of the first PON are registered with the OLT of the second PON. Operation 6011 must precede optional 6021 if present and 6012 must precede optional 6022 if present, but otherwise all of the aforementioned operations can occur in any order with respect to one another, or partially or fully in parallel to one another in any combination.

Subsequently, at 6030 an indication that a fault has been detected on the first PON is obtained. Obtaining an indication that a fault has been detected on the first PON at 6030 can comprise detecting the fault, for example with a light detector. Alternatively, obtaining an indication that a fault has been detected on the first PON at 6030 can comprise receiving a signal indicating that a fault has been detected over a communication link, which could for example be wired or wireless.

Responsive to obtaining the indication that the fault has been detected at 6030, at 6031 switching of the optical network to the second configuration is initiated. Initiating switching of the optical network to the second configuration at 6031 can comprise switching the optical network to the second configuration, for example by direct control of the optical switch. Alternatively, initiating switching of the optical network to the second configuration at 6031 can comprise transmitting a signal instructing switching of the optical network to the second configuration over a communication link, which could for example be wired or wireless.

Communication between the OLT of the second PON and one or more of the ONUs of the first PON can then proceed at optional 6041, since the ONUs of the first PON have already been registered with the OLT of the second PON at previous 6013. Communication between the OLT of the second PON and one or more of the ONUs of the second PON can also continue at optional 6042.

At optional 6050, fixing of the fault can be initiated. Initiating fixing of the fault at optional 6050 can comprise fixing the fault. Alternatively, initiating fixing of the fault at optional 6050 can comprise transmitting a signal instructing fixing of the fault over a communication link, which could for example be wired or wireless.

Subsequently, once the fault on the first PON has been fixed, switching of the optical network to its first configuration can be initiated at optional 6051. Initiating switching of the optical network to the first configuration at optional 6051 can comprise switching the optical network to the first configuration, for example by direct control of the optical switch. Alternatively, initiating switching of the optical network to the first configuration at optional 6051 can comprise transmitting a signal instructing switching of the optical network to the first configuration over a communication link, which could for example be wired or wireless.

Subsequently, once the optical network has been switched back to the first configuration, communication between the OLT of the first PON and the ONUs of the first PON can resume at optional 6021 and communication between the OLT of the second PON and the ONUs of the second PON can continue at optional 6022.

At any time between registering the ONUs of the first PON with the OLT of the second PON at 6013 and obtaining the indication that the fault has been detected on the first PON at 6030, bandwidth can be reserved on the second PON for the ONUs of the first PON at optional 6014. The communication between the OLT of the second PON and one or more of the ONUs of the first PON at optional 6041 can then be performed using that reserved bandwidth.

In this way, none of the ONUs of the first PON lose their service as a result of the fault.

Figure 7:
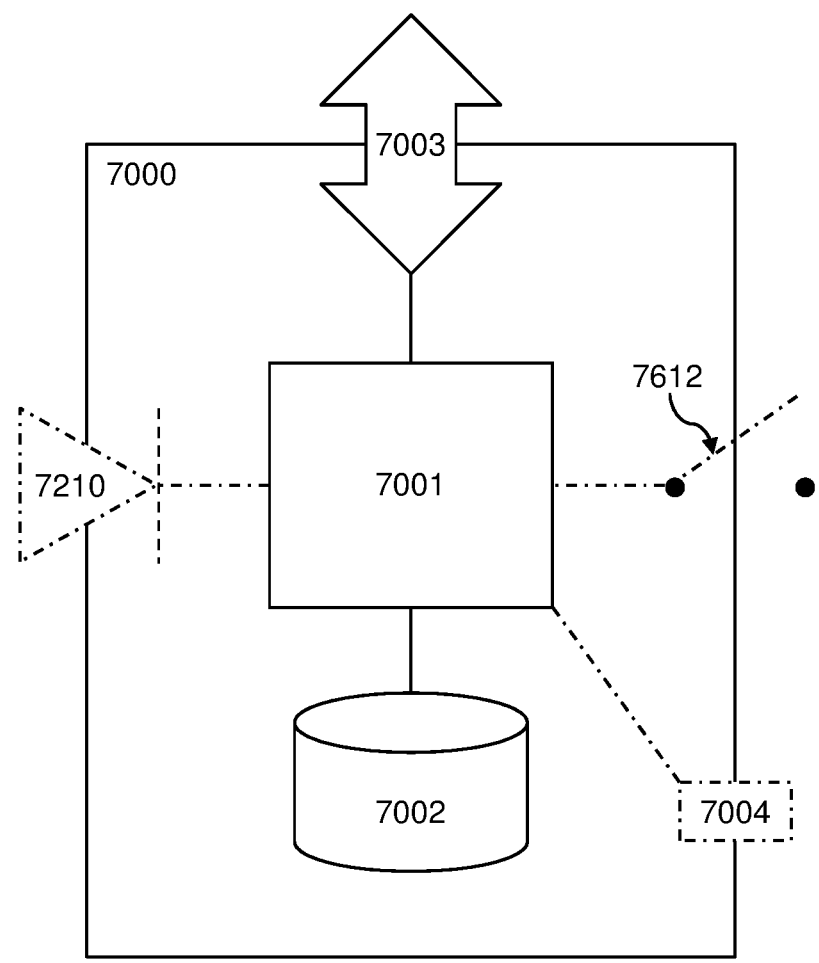
FIG. 7 illustrates an example computing system.

The method 6000 can be implemented by a computing system. FIG. 7 schematically illustrates a suitable computing system 7000. The computing system 7000 comprises a processor 7001 operably connected to each of a memory 7002 and a transceiver 7003. The memory 7002 can store a computer program comprising instructions which, when executed by the processor 7001 cause the computer system 7000 to control the optical network so that the method 6000 is performed.

The computing system 7000 can optionally further comprise one or more additional components. For example a fault detector 7210, such as a light detector (e.g. photodiode) can optionally be operably connected to the processor 7001 such that the fault detector 7210 can indicate to the processor 7001 when it detects a fault. An optical switch 7612 arranged to switch the optical network between the first and second configurations can optionally be operably connected to the processor 7001 such that the switch 7612 can be controlled thereby. Fault fixing apparatus 7004 can optionally be operably connected to the processor 7001 such that the fault fixing apparatus 7004 can be controlled thereby.

Other embodiments will be apparent to those skilled in the art from consideration of the specification and practice of the embodiments disclosed herein. It is intended that the specification and examples be considered as exemplary only.

In addition, where this application has listed the steps or operations of a method or procedure in a specific order, it could be possible, or even expedient in certain circumstances, to change the order in which some steps or operations are performed, and it is intended that the particular steps or operations of the method or procedure claims set forth herein not be construed as being order-specific unless such order specificity is expressly stated in the claim. That is, the operations/steps may be performed in any order, unless otherwise specified, and embodiments may include additional or fewer operations/steps than those disclosed herein. It is further contemplated that executing or performing a particular operation/step before, contemporaneously with, or after another operation is in accordance with the described embodiments.

The methods described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, compact discs (CDs), digital versatile discs (DVDs), or other media that are capable of storing code and/or data.

Where a processor is referred to herein, this is to be understood to refer to a single processor or multiple processors operably connected to one another. Similarly, where a memory is referred to herein, this is to be understood to refer to a single memory or multiple memories operably connected to one another.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessorbased systems, set top boxes, programmable consumer electronics, mobile telephones, network personal computers (PCs), minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

Receivers and transmitters as described herein may be standalone or may be comprised in transceivers. A communication link as described herein comprises at least one transmitter capable of transmitting data to at least one receiver over one or more wired or wireless communication channels. Wired communication channels can be arranged for electrical or optical transmission. Such a communication link can optionally further comprise one or more relaying transceivers.

The invention claimed is:

1. An optical network comprising:
a first passive optical network (PON) and a second PON, each of the first PON and the second PON comprising:
an optical line terminal (OLT),
one or more optical network units (ONUs), and
an optical splitter downstream of the OLT and upstream of the one or more ONUs, the optical splitter comprising:
a plurality of inputs, one of the plurality of inputs being coupled to the OLT, and
a plurality of outputs, each of the one or more ONUs being coupled to one of the plurality of outputs; and
an optical switch configured to switch the optical network from a first configuration, in which the optical switch is left open so that the first PON and the second PON operate independently, to a second configuration in response to a fault being detected on the first PON, wherein:
one of the plurality of outputs of the optical splitter of the second PON is uncoupled in the first configuration, and
one of the plurality of inputs of the optical splitter of the first PON is:
uncoupled in the first configuration, and coupled to the one of the plurality of outputs of the optical splitter of the second PON in the second configuration, such that the second PON is capable of providing protection to the first PON.

2. The optical network of claim 1, wherein the optical switch is configured to be powered by energy harvested from a further splitter coupled between the one of the plurality of inputs of the optical splitter of the first PON and the optical switch.

3. The optical network of claim 1, wherein the optical switch is configured to be powered by energy harvested from one of the outputs of the optical splitter of the first PON.

4. The optical network of claim 1, wherein the optical switch is configured to be powered by energy harvested from an input of the optical splitter of the second PON that is otherwise uncoupled.

5. The optical network of claim 1, further comprising a light detector arranged to detect light transmitted over the first PON, the light detector being operably coupled to the optical switch such that the optical switch switches the optical network from the first configuration to the second configuration in response to a signal from the light detector.

6. The optical network of claim 5, wherein the light detector is configured to detect light transmitted through one of the outputs of the optical splitter of the first PON.

7. The optical network of claim 6, wherein the one of the outputs of the optical splitter of the first PON is directly coupled only to the light detector.

8. The optical network of claim 6, wherein the light detector is configured to detect light transmitted through a further splitter coupled to the first PON downstream of the optical splitter of the first PON.

9. The optical network of claim 5, wherein the light detector is configured to detect light transmitted through the one of the plurality of inputs of the optical splitter of the first PON, the one of the plurality of inputs being coupled to both the optical switch and the light detector via a further splitter.

10. The optical network of claim 5, wherein the light detector is operably coupled to the optical switch such that the optical switch switches the optical network from the first configuration to the second configuration in response to at least one of:
no light being detected by the light detector for a predetermined period of time;
light detected by the light detector being of an intensity below a predetermined threshold; or
no light of an intensity above a predetermined threshold being detected by the light detector for a predetermined period of time.

11. The optical network of claim 5, wherein the optical switch is configured to be powered by energy harvested from the light detector.

12. The optical network of claim 1, wherein the optical switch is a microelectromechanical switch (MEMS).

13. The optical network of claim 1, further comprising one or more additional PONs configured with respect to the first PON and the second PON such that each of the first PON, the second PON, and the one or more additional PONs is capable of providing protection to another of the first PON, the second PON, and the one or more additional PONs in a cyclical manner.

14. The optical network of claim 1, further comprising a further optical switch configured to switch the optical network from the first configuration to a third configuration in response to a fault being detected on the second PON, wherein:
one of the plurality of outputs of the optical splitter of the first PON is uncoupled in the first configuration, and
one of the plurality of inputs of the optical splitter of the second PON is:
uncoupled in the first configuration, and
coupled to the one of the plurality of outputs of the optical splitter of the first PON in the third configuration,
such that the first PON and the second PON form a pair of PONs capable of providing one another with mutual protection.

15. The optical network of claim 14, further comprising one or more additional pairs of PONs capable of providing one another with mutual protection in the same manner as the first PON and the second PON.

16. The optical network of claim 1, further comprising two or more additional PONs configured with respect to the first PON and the second PON such that each of the first PON, the second PON, and the two or more additional PONs is capable of providing protection to one or more others of the first PON, the second PON, and the two or more additional PONs in a cyclical or mutual manner.

17. A method of operating the optical network of claim 1, the method comprising:
   registering all ONUs of the first PON with the OLT of the first PON and registering all ONUs of both the first PON and the second PON with the OLT of the second PON;
   subsequently, with the optical network in the first configuration, detecting a fault on the first PON; and
   responsive thereto, switching the optical network to the second configuration.

18. The method of claim 17, further comprising, while the optical network is in the second configuration, communicating between the OLT of the second PON and the one or more of the ONUs of the first PON.

19. The method of claim 18,
   further comprising, prior to detecting the fault, reserving bandwidth on the second PON for the ONUs of the first PON,
   wherein the communicating between the OLT of the second PON and one or more of the ONUs of the first PON is performed using the reserved bandwidth.

20. The method of claim 17, further comprising:
   subsequent to switching the optical network to the second configuration, fixing the fault; and
   responsive thereto, switching the optical network to the first configuration.

21. The method of claim 17, wherein the optical network further comprises a light detector arranged to detect light transmitted over the first PON, the light detector being operably coupled to the optical switch such that the optical switch switches the optical network from the first configuration to the second configuration in response to a signal from the light detector, wherein the light detector is configured to detect light transmitted through one of the outputs of the optical splitter of the first PON, and wherein the light detector is configured to detect light transmitted through a further splitter coupled to the first PON downstream of the optical splitter of the first PON, and wherein detecting the fault comprises determining that:
   no light has been detected by the light detector for a predetermined period of time,
   light detected by the light detector is of an intensity below a predetermined threshold, or
   no light of an intensity above a predetermined threshold has been detected for a predetermined period of time.

22. The method of claim 17, implemented by a computer system.

23. A computer program comprising instructions which, when the program is executed by a computer, cause the computer to carry out the method of claim 22.

24. A computer-readable data carrier having stored thereon the computer program of claim 23.

25. A data carrier signal carrying the computer program of claim 23.

* * * * *